US012243526B2

(12) United States Patent
van Scheltinga et al.

(10) Patent No.: US 12,243,526 B2
(45) Date of Patent: *Mar. 4, 2025

(54) DETERMINING WHETHER TO AUTOMATICALLY RESUME FIRST AUTOMATED ASSISTANT SESSION UPON CESSATION OF INTERRUPTING SECOND SESSION

(71) Applicant: GOOGLE LLC, Mountain View, CA (US)

(72) Inventors: Andrea Terwisscha van Scheltinga, Zurich (CH); Nicolo D'Ercole, Oberrieden (CH); Zaheed Sabur, Baar (CH); Bibo Xu, San Jose, CA (US); Megan Knight, Mountain View, CA (US); Alvin Abdagic, Zurich (CH); Jan Lamecki, Zurich (CH); Bo Zhang, Kilchberg (CH)

(73) Assignee: GRAY ICE HIGDON, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,898

(22) Filed: Aug. 28, 2023

(65) Prior Publication Data

US 2023/0402035 A1 Dec. 14, 2023

Related U.S. Application Data

(63) Continuation of application No. 17/552,887, filed on Dec. 16, 2021, now Pat. No. 11,830,491, which is a
(Continued)

(51) Int. Cl.
*G10L 15/22* (2006.01)
*G06F 3/16* (2006.01)
*G10L 15/08* (2006.01)

(52) U.S. Cl.
CPC .............. *G10L 15/22* (2013.01); *G06F 3/167* (2013.01); *G10L 15/083* (2013.01); *G10L 2015/223* (2013.01)

(58) Field of Classification Search
CPC ......... G10L 15/22; G10L 15/00; G10L 15/08; G10L 15/10; G10L 15/148; G10L 15/183;
(Continued)

(56) References Cited

U.S. PATENT DOCUMENTS 8,660,849 B2 2/2014 Gruber et al.
9,116,952 B1 8/2015 Heiler et al.
(Continued)

FOREIGN PATENT DOCUMENTS

CN 105634760 6/2016
CN 107957776 4/2018
(Continued)

OTHER PUBLICATIONS

European Patent Office; Communication issued in Application No. 22196579.1; 9 pages; dated Dec. 14, 2022.
(Continued)

*Primary Examiner* — Qi Han
(74) *Attorney, Agent, or Firm* — Gray Ice Higdon

(57) ABSTRACT

Determining whether, upon cessation of a second automated assistant session that interrupted and supplanted a prior first automated assistant session: (1) to automatically resume the prior first automated assistant session, or (2) to transition to an alternative automated assistant state in which the prior first session is not automatically resumed. Implementations further relate to selectively causing, based on the determining and upon cessation of the second automated assistant session, either the automatic resumption of the prior first
(Continued)

automated assistant session that was interrupted, or the transition to the state in which the first session is not automatically resumed.

18 Claims, 9 Drawing Sheets

Related U.S. Application Data continuation of application No. 16/618,920, filed as application No. PCT/US2019/030271 on May 1, 2019, now Pat. No. 11,217,247.

(60) Provisional application No. 62/668,151, filed on May 7, 2018.

(58) Field of Classification Search
CPC ..... G10L 15/193; G10L 15/20; G10L 15/222; G10L 15/24; G10L 15/26; G10L 2015/221–228
USPC .............................. 704/270, 270.1, 275, 276
See application file for complete search history.

(56) References Cited

U.S. PATENT DOCUMENTS

| | | | |
|---|---|---|---|
| 9,547,690 | B2 | 1/2017 | Nowak-Przygodzki et al. |
| 11,217,247 | B2 | 1/2022 | van Scheltinga et al. |
| 2007/0211875 | A1 | 9/2007 | Nurmi |
| 2013/0275164 | A1 | 10/2013 | Gruber et al. |
| 2014/0046891 | A1 | 2/2014 | Banas |
| 2014/0244712 | A1 | 8/2014 | Walters et al. |
| 2016/0035352 | A1 | 2/2016 | Furumoto |
| 2016/0260436 | A1 | 9/2016 | Lemay et al. |
| 2016/0371207 | A1* | 12/2016 | Doerr .................. G06F 13/24 |
| 2019/0019504 | A1* | 1/2019 | Hatambeiki ............ G10L 15/20 |
| 2022/0108696 | A1 | 4/2022 | Van Scheltinga et al. |

FOREIGN PATENT DOCUMENTS

| | | |
|---|---|---|
| JP | H10104003 | 4/1998 |
| JP | 2003009207 | 1/2003 |
| JP | 2004108908 | 4/2004 |
| JP | 2008191074 | 8/2008 |
| KR | 20170105581 | 9/2017 |
| KR | 20170119715 | 10/2017 |
| KR | 20180073493 | 7/2018 |
| WO | 2007119383 A1 | 10/2007 |
| WO | 2012137933 | 10/2012 |

OTHER PUBLICATIONS

Korean Intellectual Property Office; Notice of Allowance issued in Application Ser. No. KR10-2020-7034930; 5 pages; dated Dec. 14, 2022.
Japanese Patent Office; Notice of Allowance issued in app. No. 2020-562772, 3 pages, dated Aug. 1, 2022.
Korean Intellectual Property Office; Notice of Office Action issued in Application Ser. No. KR10-2020-7034930; 17 pages; dated May 30, 2022.
European Patent Office; Intention to Grant issued in Application No. 19724009.6, 56 pages, dated Jun. 30, 2022.
European Patent Office; Intention to Grant issued in Application No. 19724009.6, 49 pages, dated Feb. 4, 2022.
Japanese Patent Office; Notice of Reasons for Rejection issued in Application No. 2020-562772; 8 pages; dated Dec. 24, 2021.
Intellectual Property India; Examination Report issued in Application No. 202027052541; 6 pages; dated Jul. 16, 2021.
European Patent Office; Sumons to attend oral proceedings pursuant to Rule 115(1) EPC issued in Application No. 19724009.6; 9 pages; dated Apr. 1, 2021.
European Patent Office; Communication Pursuant to Article 94(3) for European Application No. 19724009.6; 6 pages; dated Jul. 23, 2020.
European Patent Office; International Search Report and Written Opinion of Ser. No. PCT/US2019/030271; 13 pages; dated Jul. 25, 2019.
Japanese Patent Office; Notice of Reasons for Rejection issued in Application No. 2022-136801; 9 pages; dated Jul. 18, 2023.
Intellectual Property India; Hearing Notice issued in Application No. 202027052541; 2 pages; dated Aug. 22, 2023.
Korean Intellectual Property Office; Notice of Office Action issued in Application Ser. No. KR10-2023-7007650; 23 pages; dated Sep. 21, 2023.
China National Intellectual Property Administration; Notification of First Office Action issued in Application No. 201980037325.8; 15 pages; dated Nov. 18, 2023.
China National Intellectual Property Administration; Notice of Grant issued in Application No. 201980037325.8; 5 pages; dated Jul. 12, 2024.
European Patent Office; Communication Pursuant to Article 94(3) for European Application No. 19724009.6; 10 pages; dated Aug. 12, 2024.
Intellectual Property India; Examination Report issued in Application No. 202328060983; 6 pages; dated Nov. 11, 2024.

\* cited by examiner

DETERMINING WHETHER TO AUTOMATICALLY RESUME FIRST AUTOMATED ASSISTANT SESSION UPON CESSATION OF INTERRUPTING SECOND SESSION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans—which when they interact with automated assistants may be referred to as "users"—may provide commands, queries, and/or requests using free-form natural language input. Free-form natural language input may include vocal utterances converted into text using automatic speech recognition and/or typed free-form natural language input.

Standalone voice-responsive speakers that provide users with the ability to vocally engage with an automated assistant are becoming more commonplace. These devices typically include few if any hardware input mechanisms that are in addition to microphone(s), other than perhaps a mute button, a touch-sensitive interface for adjusting volume, etc. A goal of these speakers is to allow users to vocally engage with automated assistants with ease, without requiring the users to physically interact with certain user interface elements such as a keyboard or mouse, to perform a variety of tasks.

Conventional standalone voice-responsive speakers typically lack full-fledged displays. At most they tend to include relatively simply visual output mechanisms, such as light-emitting diodes, etc., that are capable of utilizing rudimentary colors and/or animation to convey simple messages. The next generation of standalone voice-responsive speakers may include more robust visual output mechanisms, such as a display or even a touchscreen display. These devices will be referred to herein as "standalone multi-modal assistant devices," as opposed to standalone voice-responsive speakers. As is the case with conventional standalone interactive speakers, standalone multi-modal assistant devices may be designed to be interacted with vocally, and typically will not include keyboards, mice, or other complex physical input components. However, standalone multi-modal assistant devices will typically include microphone(s) for vocal interaction and touchscreens for interaction via various touch inputs received via the touchscreen.

SUMMARY

With standalone multi-modal assistant devices, users engaging with the devices can often interact with the device using either touch inputs or spoken utterances. Moreover, users may engage with the devices when they are relatively close to the device (e.g., next to or within a few feet), relatively far away from the device (e.g., more than ten feet away), and even when they are moving around an environment. For example, a user can engage with a multi-modal assistant device to seek assistance in the performance of a multi-step task, such as installing and configuring a new smart thermostat. During performance of the task, the user can interact with the multi-modal assistant device via touch and/or spoken inputs to cause the multi-modal assistant device to audibly and/or graphically render various steps and/or other guidance related to installing and configuring the new smart thermostat. When providing such inputs and/or when ascertaining content rendered by the multi-modal assistant device, the user may move throughout an environment. Accordingly, the users' viewpoint with respect to a display of the device may change, thereby affecting the ability of the user to view content rendered via the display. Further, the user's changing position may affect his/her ability to hear any content audibly rendered via speaker(s) of the multi-modal device.

In view of these and other considerations, implementations disclosed herein render, during an active session with a user, only content that is relevant to the active session. For example, in response to a spoken utterance of "walk me through installing smart thermostat X", a display of the standalone multi-modal assistant device and speaker(s) of the device can exclusively render content that is related to installing and configuring "smart thermostat X". In other words, any previously rendered content can be fully supplanted by the content of the active session. For instance, assume a daily weather forecast was being rendered on the display in a prior session in response to a prior spoken utterance of "today's weather forecast". The display of the weather forecast can be supplanted, in response to the spoken utterance of "walk me through installing smart thermostat X", by visual content related to "smart thermostat X" installation in a newly active session. In these and other manners, rendering of the content for the active session can utilize the full extent of a display and/or of speaker(s) of the multi-modal assistant device, without "splitting" a display to present content from two sessions, and without simultaneously rendering audio from two different sessions (e.g., with one at a "lower" volume). In addition to conserving resources by preventing the simultaneous rendering of content from two sessions, this can also enable a user to more readily and quickly ascertain content in an active session, thereby potentially shortening a duration of the active session.

While rendering only content that is relevant to an active session provides various advantages, it can also present problems when the active session interrupts a prior session before the prior session is completed. For example, upon cessation of the active session that interrupts the prior session, it can be unclear as to whether the interrupted prior session should be: automatically resumed (e.g., resumed upon cessation of the active session and without requiring further user interface input); not automatically resumed, but suggested for resumption (e.g., an interface element displayed that can be touched to resume the prior session); not automatically resumed nor suggested for resumption, but resumable in response to an explicit user request (e.g., a spoken utterance of "resume prior session"); or not automatically resumed and expired completely (e.g., data cleared from memory to make resumption of the prior session, in its state when interrupted, impossible without prolonged user interaction to recreate the state of the prior session).

Techniques that exclusively completely expire prior sessions can directly result in waste of computer and network resources. For example, assume the prior session is in a state that is the result of multiple human-automated assistant dialog turns, and the user desires to return to the prior session following cessation of an interrupting session. With techniques that exclusively completely expire prior sessions, resumption of the prior session isn't possible without again performing the resource intensive multiple human-automated assistant dialog turns to recreate the state of the prior session. Techniques that exclusively always return to prior sessions can also directly result in waste of computer and network resources. For example, where the user does not desire to return to the prior session following cessation of an interrupting session, again rendering content from the prior session and/or storing its state in memory can unnecessarily consume various resources.

In general, challenges are presented in assistant devices in ensuring efficient management of multiple overlapping sessions and resources provided for these. Particularly where one or more aspects of an interface presented by an assistant is implemented as audio (e.g. via spoken utterances) there is a challenge in presenting parallel session information in an environment which includes linear presentational aspects. While multi-modal assistant devices, such as those including a display, may present opportunities for additional interface information to be conveyed, they also present greater opportunities for interactions to comprise multiple sessions. Managing the use of resources applied to overlapping tasks in an assistant environment presents challenges not amenable to solutions previously used in alternative interfaces.

In view of these and other considerations, implementations disclosed herein relate to determining whether, upon cessation of a second automated assistant session that interrupted and supplanted a prior first automated assistant session: (1) to automatically resume the prior first session, or (2) to transition to an alternative state in which the prior first session is not automatically resumed. In some implementations, when it is determined to transition to the alternative state in which the prior first session is not automatically resumed, the alternative state can be an alternative state where the prior session is not resumed automatically and is expired completely; an alternative state where the prior session is not resumed automatically, but is suggested for resumption via user interface output (e.g., via rendering of a graphical element); or an alternative state where the prior session is not automatically resumed nor suggested for resumption, but can be resumed in response to an explicit user request. Some of those implementations can always transition to the same alternative state when it is determined to transition to the alternative state in which the first session is not automatically resumed. Other implementations can select from one or more of those alternative states in determining to transition to the alternative state in which the first session is not automatically resumed.

Implementations described herein further relate to selectively causing, upon cessation of the second session, either the automatic resumption of the prior first session that was interrupted, or the transition to the state in which the first session is not automatically resumed. Those implementations selectively cause one of those two actions to occur based on the determination of whether (1) to automatically resume the prior first session, or (2) to transition to an alternative state in which the prior first session is not automatically resumed. As described in detail herein, various techniques can be utilized in making such a determination, such as techniques that take into account one or more properties of the prior first session and/or of the interrupting second session. Making such a determination and selectively causing performance of only one of the two actions can directly result in various advantages. In particular, by providing alternative approaches to the management of transitions between sessions, improved allocation of resources can be achieved. For example, selective automatic resumption of the prior first session can lessen (e.g., to zero) a quantity of inputs that a user must make to resume the prior first session, while being performed only selectively and based on various consideration(s) to mitigate risk of automatic resumption when it's not desired. Also, for example, selective transitioning to a state where the prior first session is not automatically resumed can prevent the automatic rendering of content from the first session and/or can result in the assistant device transitioning to a lower-power state more quickly, while being performed only selectively and based on various consideration(s) to mitigate risk of non-automatic resumption when it's not desired. Further, selective performance of one of the two actions provides for an improved interaction protocol that furthers human-automated assistant interactions in the performance of various tasks, such as controlling smart devices, configuring smart devices, installing smart devices, etc.

In some implementations, determining whether, upon cessation of a second session that interrupted and supplanted a prior first session: (1) to automatically resume the prior first session, or (2) to transition to an alternative state in which the prior first session is not automatically resumed, is based at least in part on one or more properties of the prior first session and/or one or more properties of the second session. In some of those implementations, a utilized property of the first session can include a classification assigned to the first content and/or a utilized property of the second session can include a classification assigned to the second content. The classification can indicate, for example, whether the corresponding content is transient or enduring. In this way, it can be recognized that sessions with differing classifications may be handled differently when included in a multiple-session environment, thus appropriately allocating resources to that content for which they are required or desirable.

Enduring content can include, for example, content that is rendered over a plurality of dialog turns and/or that is dynamically rendered in dependence on user interface input during the dialog turns. For instance, content rendered in guiding user installation and configuration of a smart device can be enduring in that it is rendered over multiple dialog turns and/or in that it is rendered a dynamic manner (e.g., if the user chooses wiring option A in a dialog turn, further content A will be provided, whereas further content B will be provided if the user instead chooses wiring option B in the dialog turn). Enduring content can additionally or alternatively include, for example, content whose entire rendering takes at least a threshold duration and/or content that is of a certain type. For instance, many (or all) videos can be classified as enduring, such as music videos that include at least a threshold duration of visually and audibly rendered content. In contrast, transient content can include content that is static and/or that is rendered in only a single dialog turn, such as an audible and/or visual weather forecast, a definition for a term, an answer to a question, etc. In some implementations, content can be classified as enduring or transient based at least in part on a source of the content. For example, content from agents that provide video content can all be classified as enduring, whereas content from an agent that provides weather information can be classified as transient. In some implementations, content can be classified as enduring or transient based at least in part on an intent determined based on a spoken utterance or a notification to which the content is responsive. For example, as described herein, spoken utterances can be processed to derive an intent and/or notifications can be associated with a corresponding intent, and some intents can be associated with enduring content while other intents can be associated with transient content. Additional and/or alternative techniques for classifying content as transient or enduring can be provided.

In some implementations, determining to automatically resume the prior first session can be based on content of the prior first session being classified as enduring and content of the second session being classified as transient. In some additional or alternative implementations, determining to transition to an alternative state in which the prior first session is not automatically resumed can be based on content of the prior first session being classified as transient. In some of those implementations, the alternative state is a state in which the prior first session is not resumed automatically and is expired completely. In some additional or alternative implementations, determining to transition to an alternative state in which the prior first session is not automatically resumed can be based on content of the prior first session being classified as enduring, and content of the second session also being classified as enduring. In some versions of those implementations, the alternative state is a state in which the prior first session is not resumed automatically, but is suggested for resumption via user interface output (e.g., via rendering of a graphical element on a "home" screen, described in more detail herein). In some other versions of those implementations, the alternative state is a state where the prior session is not automatically resumed nor suggested for resumption, but resumable in response to an explicit user request. In some additional or alternative implementations, determining to automatically resume the prior first session can be based on content of the prior first session being classified as enduring, content of the second session being classified as enduring, and a further determination that content of the prior first session embodies an entity and that a defined relationship exists between the entity content of the second session.

In various implementations described herein, interruption data is received during the rendering of first content for the first session and, in response to receiving the interruption data, alternative content is rendered during a second session. In some of those implementations, the interruption data is a spoken input of the user and is determined to be interruption data based on the spoken input including a request for the alternative content and the alternative content being different than the first content of the first session. For example, the first content of the first session can be related to configuring a smart device, the spoken input can be "how do you make a mint julep", and can be determined to be interruption data based on including a request for content (guidance related to making a mint julep) that is unrelated to the smart device configuration content of the first session. In contrast, if the first content being displayed during the first session is one of multiple steps related to configuring a smart device, and the spoken input is "next", the spoken input will not be determined to not be interruption data but, instead, determined to be a request for the next portion of the first content to be rendered.

In some additional or alternative implementations, the interruption data can be user interface input that indicates a desire to interact with a notification that is received during the first session and is visually and/or audibly rendered during the rendering of the first content during the first session. For example, the notification can be an incoming audio and/or visual call and an interactive graphical interface element can be overlaid atop visually rendered content of the first session. An affirmative selection of the notification graphical interface element can be the interruption data and the alternative content rendered during the second session can be the audio and/or visual call. The affirmative selection can be, for example, a particular positive touch selection (e.g., a swipe right or a double tap) or a positive vocal utterance (e.g., "OK", "accept the notification"). In contrast, a negative selection of the graphical interface element (e.g., a particular negative touch selection such as swipe down) can cause the notification to be dismissed without interruption of the first session. Interruption data, as used herein, references data that indicates a desire to cause alternative content to be rendered as part of an alternative session and can be contrasted with user interface inputs that seek only to cause cessation of the current cessation (e.g., a spoken command of "stop" or "pause", a touch of an interactive "X" or other cessation graphical element).

In various implementations, first session data, for the interrupted first session can be stored and utilized to automatically resume the first session in a state of the first session when the interruption data was received. In some of those implementations, the first session data is optionally persisted only in response to determining to resume the first session. The first session data can be stored in various ways. In some implementations, an entire transcript of a human-to-computer dialog of the first session may be preserved so that, for instance, a state of the first session can be rebuilt or resumed, e.g., on the fly and/or as needed, by detecting intents, slot values, entities, etc. in the preserved transcript. Additionally or alternatively, in some implementations, only core elements of a state, such as detected intent(s), slot values, mentioned entities, etc., may be preserved in various formats, such as JavaScript Object Notation ("JSON") or other similar formats. First session data may be preserved in various locations. In some implementations, first session data may be persisted in memory that is local to the computing device operated by the user to engage with the automated assistant. This may give rise to various technical benefits, such as mitigating latency in resumption of the first session. Additionally or alternatively, in some implementations, the first session data may be persisted remotely from the user's computing device, e.g., in memory of one or more computing systems that collectively operate what is often referred to as a "cloud-based service."

The above description is provided as only an overview of various implementations described herein. Additional description of those various implementations, as well as additional implementations, is provided herein.

In some implementations, a method performed by one or more processors is provided and includes receiving user input data indicative of a user input detected via a user interface input component of a client device. The method further includes identifying, based on the user input data, first content that is responsive to the user input. The method further includes, in response to receiving the user input data, causing the client device to render at least part of the first content during a first session. The method further includes receiving interruption data during rendering of the first content by the client device during the first session. The interruption data is received in response to further user interface input of the user that is detected during rendering of the first content during the first session. The method further includes, in response to receiving the interruption data, causing the client device to render alternative content during a second session that at least temporarily replaces the first session. The alternative content is different from the first content, and causing the client device to render the alternative content during the second session comprises causing the client device to render the alternative content in lieu of the first content. The method further includes determining whether, upon cessation of the second session: to cause the client device to automatically resume the first session, or to cause the client device to transition to an alternative state in which the client device does not automatically resume the first session. The determining is based at least on one or more properties of the first session. The method further includes, upon cessation of the second session and dependent on the determining, selectively causing the client device to either automatically resume the first session or to transition to the alternative state in which the first session is not automatically resumed.

These and other implementations of the technology described herein can include one or more of the following features.

In some implementations, the user input data includes spoken utterance data indicative of a spoken utterance of a user detected via one or more microphones of a client device.

In some implementations, at least one property of the first session on which the determining is based includes a classification assigned to the first content. In some versions of those implementations, the classification assigned to the first content indicates whether the first content is transient or enduring. In some of those versions, the determining includes determining to cause the client device to transition to the alternative state, in which the client device does not automatically resume the first session, based on the classification assigned to the content indicating the first content is transient.

In some implementations, at least one property of the first session on which the determining is based indicates whether the first content is transient or enduring, and the determining is further based on one or more properties of the second session. In some of those implementations, the at least one property of the second session indicates whether the alternative content is transient or enduring. In some versions of those implementations, the determining includes determining to cause the client device to automatically resume the first session based on the classification assigned to the first content indicating the first content is enduring and at least one property of the second session indicating the alternative content is transient. In some other versions of those implementations, the determining includes determining to cause the client device to transition to the alternative state, in which the client device does not automatically resume the first session, based on the classification assigned to the first content indicating the content is enduring and at least one property of the second session indicating the alternative content is enduring.

In some implementations, the further user interface input is a further spoken utterance of the user. In some of those implementations, the method further includes determining the further spoken input is interruption data based on the further spoken input including a request for the alternative content and the alternative content being different than the first content of the first session.

In some implementations, at least one property of the first session on which the determining is based includes an entity embodied by the first content, and the determining includes determining to cause the client device to automatically resume the first session based on determining a relationship between the alternative content and the entity embodied by the first content.

In some implementations, the method further includes: receiving, during rendering of the first content by the client device during the first session, a notification to be rendered at the client device; and in response to receiving the notification, causing the client device to render the notification. In some of those implementations, the further user interface input is an affirmative touch or spoken input of the user that is provided in response to the client device rendering the notification, the affirmative input of the user indicates a desire of the user to interact with the notification, and the alternative content is based on the notification.

In some implementations, the method further includes storing first session state data, for the first session, that indicates a state of the first session when the interruption data was received. In those implementations, causing the client device to automatically resume the first session can include using the first session state data to resume the first session in the state of the first session when the interruption data was received.

In some implementations, the determining includes determining to cause the client device to transition to the state in which the client device does not automatically resume the first session. In some of those implementations, the method further includes, in response, clearing session data, for the first session, from memory of the client device or a remote server in network communication with the client device.

In some implementations, the client device includes a display and at least one speaker, and rendering the content includes rendering the content via the display and the at least one speaker.

In some implementations, the alternative state in which the client device does not automatically resume the first session includes display of a home screen or an ambient screen. In some versions of those implementations, the display of the home screen or the ambient screen lacks any reference to the first session. In some other versions of those implementations, the display of the home screen or the ambient screen includes a selectable graphical interface element that can be selected to resume the first session.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

DETAILED DESCRIPTION

Figure 1:
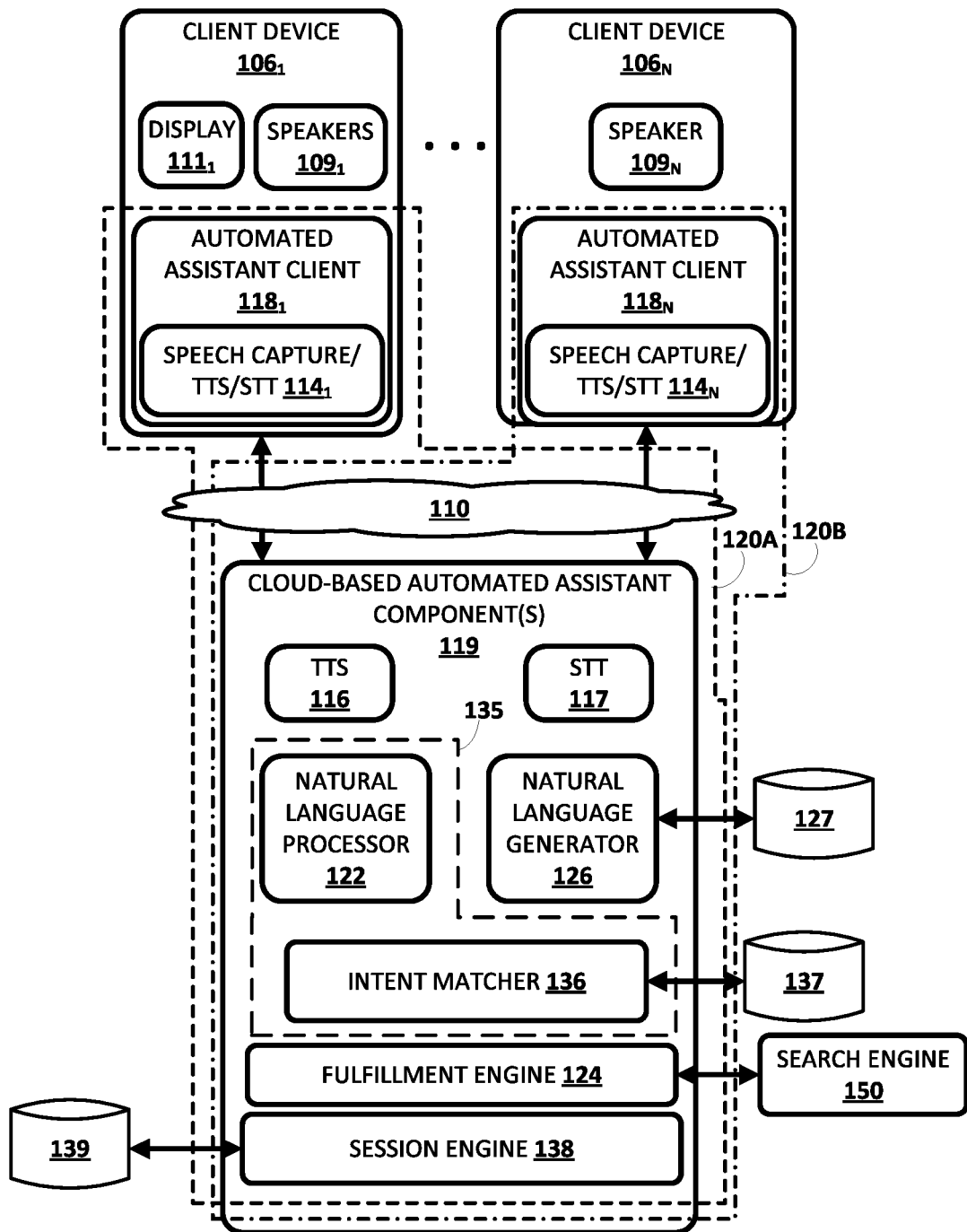
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119.

It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

For purposes of the present disclosure, in FIG. 1, first client device $106_1$ takes the form of a standalone multi-modal assistant device with a speaker $109_1$ and a display $111_1$, and may lack complex hardware input components, (aside from display 111 being a touchscreen in some implementations) such as a keyboard or mouse. While techniques described herein will be described in the context of being performed using a standalone multi-modal assistant device such as $106_1$, this is not meant to be limiting. Techniques described herein may be implemented on client devices having other form factors (but still lacking standard keyboards and mice), such as vehicular computing devices that are meant to be interacted with primarily via vocal and/or touch interactions. A second client device $106_N$ is a standalone voice-responsive speaker that includes a speaker $109_N$ through which automated assistant 120A may provide natural language output. Techniques described herein can additionally or alternatively be implemented via second client device $106_N$ in association with audio content, of sessions, rendered via the second client device $106_N$.

As described in more detail herein, automated assistant 120 engages in human-to-computer dialog sessions with one or more users via user interface input and output devices of one or more client devices $106_{1-N}$. In the case of standalone multi-modal assistant devices such as client device $106_1$, these input devices may be limited to microphones (not depicted) and display 111 (in implementations in which display 111 is a touchscreen), as well as optionally other sensors (e.g., PIR, cameras) that may be used, for example, to detect presence of a person nearby. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, the particular user interface input may be user interaction with a hardware button and/or virtual button (e.g., a tap, a long tap), an oral command (e.g., "Hey Automated Assistant"), and/or other particular user interface input.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, the user can utter commands, searches, etc., and automated assistant 120 may utilize speech recognition to convert the utterances into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various embodiments, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. Each speech capture/TTS/STT module 114 may be configured to perform one or more functions: capture a user's speech, e.g., via a microphone (speech capture); convert that captured audio to text and/or to other representations or embeddings (SU); and/or convert text to speech (TTS). For example, in some implementations, because a client device 106 may be relatively constrained in terms of computing resources (e.g., processor cycles, memory, battery, etc.), the SU module 114 that is local to each client device 106 may be configured to convert a finite number of different spoken phrases to text (or to other forms, such as lower dimensionality embeddings). Other speech input may be sent to cloud-based automated assistant components 119, which may include a cloud-based STT module 117.

Cloud-based SU module 117 may be configured to leverage the virtually limitless resources of the cloud to convert audio data captured by speech capture/TTS/STT module 114 into text (which may then be provided to natural language processor 122). Cloud-based US module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, one or more of the components of automated assistant 120, such as natural language understand engine 135, speech capture/ TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form natural language input is input that is formulated by a user and that is not constrained to a group of options presented for selection by the user.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a morphological engine that may separate individual words into morphemes and/or annotate the morphemes, e.g., with their classes. Natural language processor 122 may also include a part of speech tagger configured to annotate terms with their grammatical roles. Also, for example, in some implementations the natural language processor 122 may additionally and/or alternatively include a dependency parser configured to determine syntactic relationships between terms in natural language input.

In some implementations, the natural language processor 122 may additionally and/or alternatively include an entity tagger configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding engine 135 may also include an intent matcher 136 that is configured to determine, based on the annotated output of natural language processor 122, an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user. In some implementations, intent matcher 136 may have access to one or more databases 137 that include, for instance, a plurality of mappings between grammars and responsive actions (or more generally, intents). Additionally or alternatively, in some implementations, one or more databases 137 may store one or more machine learning models that are trained to generate output indicative of user intent, based on the user's input.

Grammars may be selected, formulated (e.g., by hand), and/or learned over time, e.g., to represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In contrast to many grammars (which may be created manually), machine learning models may be trained automatically, e.g., using logs of interactions between users and automated assistants. Machine learning models may take various forms, such as neural networks. They may be trained in various ways to predict user intent from user input. For example, in some implementations, training data may be provided that includes individual training examples. Each training example may include, for instance, free form input from a user (e.g., in textual or non-textual form) and may be labeled (e.g., by hand) with an intent. The training example may be applied as input across the machine learning model (e.g., a neural network) to generate output. The output may be compared to the label to determine an error. This error may be used to train the model, e.g., using techniques such as gradient descent (e.g., stochastic, batch, etc.) and/or back propagation to adjust weights associated with hidden layer(s) of the model. Once such a model is trained with a (usually large) number of training examples, it may be used to generate output that predicts intents from unlabeled free-form natural language inputs.

In some implementations, automated assistant 120 may facilitate (or "broker") transactions between users and applications (also referred to as agents), such as third party applications. These applications may or may not operate on computing systems that are separate from those that operate, for instance, cloud-based automated assistant components 119. Accordingly, one kind of user intent that may be identified by intent matcher 136 is to engage an application, such as a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment engine 124 may be configured to receive the intent output by intent matcher 136, as well as any associated slot values (whether provided by the user proactively or solicited from the user) and fulfill the intent. In various embodiments, fulfillment of the user's intent may cause various fulfillment information to be generated/obtained, e.g., by fulfillment engine 124. As will be described below, the fulfillment information may in some implementations be provided to a natural language generator 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment engine 124, which as depicted in FIG. 1 may be in communication with one or more search engines 150 configured to search corpuses of documents and/or other data sources (e.g., knowledge graphs, etc.) for responsive information. Fulfillment engine 124 may provide data indicative of the search query (e.g., the text of the query, a reduced dimensionality embedding, etc.) to search engine 150. Search engine 150 may provide responsive information, such as "Timberline Lodge, Mt. Hood, Oregon." This responsive information may form part of the fulfillment information generated by fulfillment engine 124.

Additionally or alternatively, fulfillment engine 124 may be configured to receive, e.g., from natural language understanding engine 135, a user's intent and any slot values provided by the user or determined using other means (e.g., GPS coordinates of the user, user preferences, etc.) and trigger a responsive action. Responsive actions may include, for instance, ordering a good/service, engaging in an interactive dialog to accomplish a task, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

As noted above, natural language generator 126 may be configured to generate and/or select natural language output (e.g., spoken words/phrases that are designed to mimic human speech) based on data obtained from various sources. In some implementations, natural language generator 126 may be configured to receive, as input, fulfillment information associated with fulfillment of an intent by fulfillment engine 124, and to generate natural language output based on the fulfillment information. Additionally or alternatively, natural language generator 126 may receive information from other sources, such as third party applications (e.g., required slots), which it may use to formulate natural language output for the user. Moreover, as described herein, content that is provided for rendering as output to a user can include graphical content, optionally along with corresponding audible content.

A session engine 138 can be configured to identify an active automated assistant session occurring via first client device $106_1$ or via second client device $106_N$. The session engine 138 can cause only content that is relevant to the active session to be rendered during the active session. Further, session engine 138 can be configured to, in response to receiving interruption data during an active first session, cause the respective client device to render alternative content during a second session that at least temporarily replaces the second session. The alternative content rendered during the second session is different than the content of the first session, and causing the client device to render the alternative content includes causing the client device to render the alternative content in lieu of the content of the first session.

The session engine 138 can determine that some instances of user interface input provided by the user constitute interruption data, based on those instances requesting alternative content be provided in lieu of the content being provided during the first session. In making such a determination, the session engine 138 can rely on output from natural language understanding engine 135, such as output that indicates spoken input and/or other natural language input of the user indicates a change from a current intent to a new intent. When such spoken input is received that is interruption data, the session engine 138 can cause alternative content, that is responsive to the new intent and determined by the fulfillment engine 124, to supplant content being rendered for the first session. The session engine 138 can additionally or alternatively determine that affirmative user interaction, with a notification provided during the first session, is interruption data. When such affirmative user interaction is received, the session engine 138 can cause alternative content, that corresponds to the notification, to supplant content being rendered for the first session.

The session engine 138 can be further configured to determine whether, upon cessation of the second session: (1) to automatically resume the prior first session, or (2) to transition to an alternative state in which the prior first session is not automatically resumed. The session engine 138 is further configured to selectively cause, upon cessation of the second session, either the automatic resumption of the prior first session that was interrupted, or the transition to the state in which the first session is not automatically resumed. The session engine 138 can selectively cause one of those two actions to occur based on the determination of whether (1) to automatically resume the prior first session, or (2) to transition to an alternative state in which the prior first session is not automatically resumed. As described herein, when the session engine 138 determines to transition to the alternative state in which the prior first session is not automatically resumed, the alternative state can be: an alternative state where the prior session is not resumed automatically and is expired completely; an alternative state where the prior session is not resumed automatically, but is suggested for resumption via user interface output; or an alternative state where the prior session is not automatically resumed nor suggested for resumption, but is resumable in response to an explicit user request.

The session engine 138 can further be configured to cause selective transition between various states in accordance with implementations described herein, such as display off, ambient, home, and session states described herein. For example, the session engine 138 can selectively transition from an interrupting session state, to either automatic resumption of a prior session state or alternatively to a state where the prior session state is not automatically resumed. Moreover, in implementations where the session engine 138 transitions to a home state where the prior session state is not automatically resumed, the session engine 138 can optionally determine whether to adapt the home state (e.g., determine whether to include an interactive element for resuming the prior session state) based on various considerations described herein. Additional description of these and other aspects of session engine 138 are described herein (e.g., in the summary, and with respect to FIGS. 2-8 below). It is noted that although session engine 138 is illustrated in FIG. 1 as implemented as part of cloud-based automated assistant component(s) 119, in various implementations all or portions of session engine 138 can be implemented by a respective automated assistant client 118.

Figure 2:
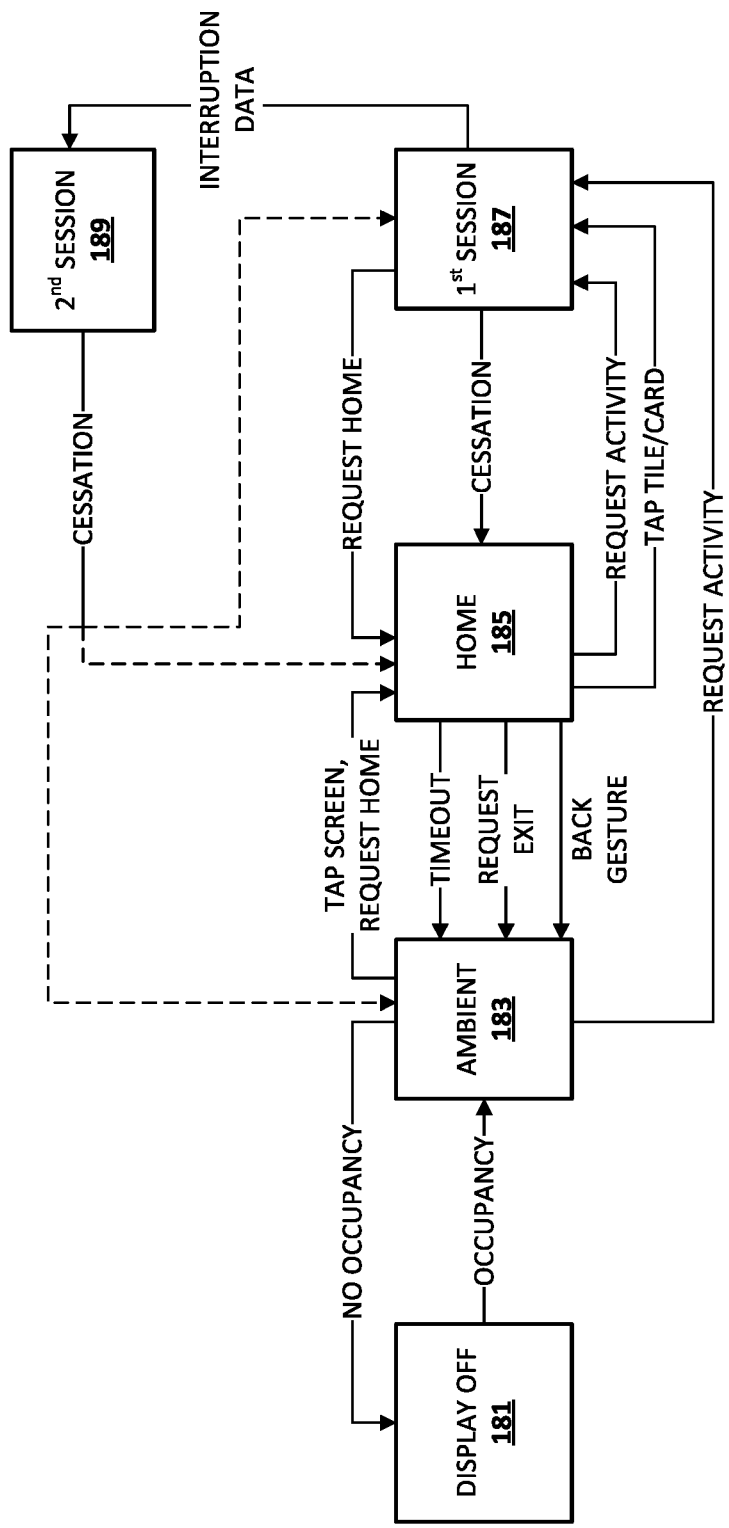
FIG. 2 depicts an example state machine that may be implemented in accordance with various implementations.

FIG. 2 depicts one example state diagram that may be implemented, e.g., by session engine 138, in accordance with various implementations. The depicted state diagram includes five states, DISPLAY OFF 181, AMBIENT 183, HOME 185, $1^{st}$ SESSION 187, and $2^{nd}$ SESSION 189. While five states are depicted, fewer or more states can be provided. For example, as described herein, $2^{ND}$ SESSION 189 is not always an active state, but rather can be created on-demand in response to interruption data being received while content is being rendered in $1^{st}$ SESSION 187. Also, for example, an additional $3^{rd}$ SESSION state can be created on-demand by the session engine 138 in response to further interruption data being received while content is being rendered in $2^{nd}$ SESSION 189. When such a $3^{rd}$ SESSION state is created, transitioning from the $3^{rd}$ SESSION state can be handled in a manner similar to that described herein with respect to transitioning from the $2^{nd}$ SESSION (e.g., either the $2^{nd}$ SESSION 189 could be automatically resumed, or an alternative state transitioned to where the $2^{nd}$ SESSION 189 is not automatically resumed).

The DISPLAY OFF 181 may be the default state in which display 111 remains asleep, e.g., using little or no power. While standalone multi-modal assistant device $106_1$ remains alone, without people nearby, DISPLAY OFF 181 may remain the current state. In some implementations, while the current state is DISPLAY OFF 181, a user (who has not yet been detected as present) may still request activity from automated assistant 120, e.g., by speaking an invocation phrase followed by a specific request, which may transition the current state directly to the FIRST SESSION 187 state.

In some implementations, when one or more persons is detected nearby (i.e., "OCCUPANCY"), the current state may be transitioned to the AMBIENT 183 state. In the AMBIENT 183 state, automated assistant 120 may cause display $111_1$ of client device $106_1$ to render ambient content that may be selected, for instance, based on its aesthetic appeal. For example, one or more digital images and/or videos of scenery or other similar content can be visually displayed, optionally with audible rendering of relaxing nature sounds. It is noted that although content is rendered in the AMBIENT 183 state, the AMBIENT 183 state is not considered a session, as that term is used herein. For example, it may not be considered a session as the content rendered in the AMBIENT 183 state is not identified and rendered responsive to a spoken utterance or in response to a user acceptance of a notification. In some implementations, if it is determined that the occupant is no longer co-present with the standalone multi-modal assistant device, e.g., for at least a predetermined time period, the current state may transition from AMBIENT 183 back to DISPLAY OFF 181.

As indicated in FIG. 2, in some implementations, while the current state is AMBIENT 183, a user may still request activity from automated assistant 120, e.g., by speaking an invocation phrase followed by a specific request, which may transition the current state to the FIRST SESSION 187 state. In other implementations, there may be no AMBIENT 183 state, and the current state may transition from DISPLAY OFF 181 directly to HOME 185 in response to detecting co-presence of a person (OCCUPANCY).

In the HOME 185 state, various graphical elements can be rendered, such as suggested actions for a user to perform through interaction with the automated assistant, a current time, current weather conditions, a brief summary of a user's calendar, etc. In some implementations, the data items may be displayed as cards or tiles, which may or may not be interactive (e.g., depending on whether display 111 is a touchscreen). Data items may in some cases be ranked based on a variety of criteria, such as priorities assigned (automatically or manually) to the data items, an identity of the co-present person (if determined), time of day, time of year, and so forth. When data items are presented as cards, e.g., in a stack, the ranking may be reflected, for instance, by the top cards being highest priority, with underlying cards having relatively lower priorities. When data items are presented as tiles, e.g., occupying a portion of the display 111, the ranking may be reflected, for instance, in the placement of the tile (e.g., top left or top right may be highest priority) and/or in the size of the tile (e.g., the larger the tile, the higher the priority). As described in detail herein, in various implementations, when the HOME 185 state is transitioned to prior to completion of a session that includes enduring content, the data items optionally include a selectable graphical element that can be selected to resume the session. It is noted that although content is rendered in the HOME 185 state, the HOME 185 state is not considered a session, as that term is used herein. For example, it may not be considered a session as the content rendered in the HOME 185 state is not identified and rendered responsive to a spoken utterance or in response to a user acceptance of a notification.

While in the HOME 185 state, should the user engage in one or more of the graphical elements representing data items, e.g., by tapping a tile or card, the current state may transition to the $1^{st}$ SESSION 187 state and render content that is responsive to the graphical element(s) interacted with by the user. For example, if one of the graphical elements is a suggestion for a music video that may be of interest to the user, the $1^{st}$ SESSION 187 state can cause audible and graphical content for the music video to be rendered. Likewise, if the user utters a vocal request to automated assistant 120 (e.g., "OK, Assistant, what is . . . ?"), the current state may transition to the $1^{st}$ SESSION 187 state, and render content that is responsive to the vocal request. In some implementations, if the co-present user neither engages vocally with automated assistant 120 nor interacts with data items rendered on display 111 for at least a predetermined time interval (i.e. TIMEOUT), the current state may transition from HOME 185 back to AMBIENT 183, or even to DISPLAY OFF 181 if there is no AMBIENT 183 state. Other events that might trigger transition from the HOME 185 state to the AMBIENT 183 (or DISPLAY OFF 181) state include, but are not limited to, a specific request from the user (e.g., tapping an exit button on display), a back gesture (e.g., waving a hand in front of a camera or other sensor) that may signal an intent of the co-present user to transition back to AMBIENT 183, etc.

In the $1^{st}$ SESSION 187 state content related to the requested activity or task may be exclusively rendered on display 111 and optionally exclusively rendered via speaker(s) 191. For example, suppose the co-present user utters a vocal request for guidance installing a smart device. In response, the whole display 111 and the speaker(s) 191 can be devoted to a multiple dialog turn interaction for guiding the user through the smart device installation process. As another example, suppose the co-present user utters a vocal request for information about a celebrity. In some implementations, responsive content may be provided vocally through the speakers 109 as natural language output by automated assistant 120, and/or rendered on display 111. In some implementations, other content responsive to the user's request (but not necessarily specifically requested by the user) may be displayed while automated assistant 120 provides the responsive content audibly. For example, if the user asks for the celebrity's birthday, the celebrity's birthday may be output audibly, while other information about the celebrity (e.g., deeplinks to show times of movies starring the celebrity, picture(s) of the celebrity, etc.) may be rendered on display 111.

The current state may be transitioned from the $1^{st}$ SESSION 187 state back to the HOME 185 state (or even the AMBIENT 183 or DISPLAY OFF 181) in response to cessation of the 1$^{st}$ SESSION 187. The cessation of the 1$^{st}$ SESSION 187 can occur in response to completion of rendering of enduring content of the 1$^{st}$ SESSION state 187 (e.g., a music video is done playing), completion of rendering of transient content and optionally after a time out after the completion. Other events may be considered cessation events, but do not constitute a completion of the 1$^{st}$ SESSION 187, such as an explicit input of the user to cancel the 1$^{st}$ SESSION 187 (e.g., a "stop" vocal utterance, a "back" touch input, a touch input on an "X" or other cancellation interactive graphical element), or a specific request to go back to the HOME 185 state, etc.

In some implementations, activities and/or tasks of the 1$^{st}$ SESSION 187 may not be completed and/or may remain open (e.g., are not explicitly canceled) when there is a cessation that causes transition to the HOME 185 state. For example, a user could pause a song or video in the middle of its rendering. As another example, a user could begin requesting a task that requires a number of slots to be filled with activity parameters, but may fail to fill all the required slots. For example, a user could begin ordering a pizza, but may stop and leave the room to ask others what toppings they would like or to request payment information from others. In some of those implementations, a new tile or card may be caused to be rendered on display 111 in the HOME state 185 that represents the incomplete 1$^{st}$ SESSION 187. In some cases, this new tile or card may be tapped by the user to continue the 1$^{st}$ SESSION 187. In many implementations, this new tile or card may only be generated for incomplete tasks that are classified as enduring tasks (whereas no tile or card would be generated for incomplete tasks that are instead classified as transient tasks).

As also illustrated in FIG. 2, the current state may be transitioned from the 1$^{st}$ SESSION 187 state to a 2$^{nd}$ SESSION 189 state in response to receiving interruption data. This can occur while the 1$^{st}$ SESSION 187 is still active and content for the 1$^{st}$ SESSION 187 is being exclusively rendered via the display 111 and/or speaker(s) 109. As described herein, the interruption data can be a spoken utterance provided by the user, when the spoken utterance requests alternative content be provided in lieu of the content being provided during the 1$^{st}$ SESSION 187. The interruption data can additionally or alternatively be affirmative user interaction, with a notification provided during the 1$^{st}$ SESSION 187. Regardless of the interruption data, receipt of the interruption data causes transition the 2$^{nd}$ SESSION 189 state, where alternative content, that corresponds to the interruption data, supplants content being rendered during the 1$^{st}$ SESSION 187 state.

Upon occurrence of cessation of the 2$^{nd}$ SESSION 189, there is a transition to either: the 1$^{st}$ SESSION 187, where rendering of content of the 1$^{st}$ SESSION 187 automatically resumes; or to the HOME 185 state or AMBIENT 183 state, where rendering of content of the 1$^{st}$ SESSION 187 state does not automatically resume. As described herein, whether transition to the 1$^{st}$ SESSION 187 state should occur, or transition to the HOME 185 or AMBIENT 183 state, can be dynamically determined based on one or more properties of the 1$^{st}$ SESSION 187 and/or the 2$^{nd}$ SESSION 189. Such properties can include, for example, whether the 1$^{st}$ SESSION 187 renders enduring or transient content and/or whether the 2$^{nd}$ SESSION renders enduring or transient content. In situations where transition to the HOME 185 state occurs and the 1$^{st}$ SESSION 187 state renders enduring content, a selectable tile, card, or other graphical element can optionally be caused to be rendered in the HOME 185 state, where selection causes transition back to the 1$^{st}$ SESSION 187 state, where the 1$^{st}$ SESSION 187 is then resumed.

Cessation of the 2$^{nd}$ SESSION 189 state can occur in response to completion of rendering of enduring content of the 2$^{nd}$ SESSION 189 (e.g., a video is done playing), or completion of rendering of transient content and optionally after a time out after the completion. Other events may be considered cessation events for the 2$^{nd}$ SESSION 189, but do not constitute a completion of the 2$^{nd}$ SESSION 189, such as an explicit input of the user to cancel the 2$^{nd}$ SESSION 189 (e.g., a "stop" vocal utterance, a "back" touch input, a touch input on an "X" or other cancellation interactive graphical element). In many situations, cessation of the 2$^{nd}$ SESSION 189 occurs without user input that directly indicates whether the user desires to return to the 1$^{st}$ SESSION 187. Accordingly, implementations described herein address such situations and can selectively, dynamically, and in a context sensitive manner, determine whether to return to and automatically resume the 1$^{st}$ SESSION 187 upon cessation of the 2$^{nd}$ SESSION 189.

Figure 3:
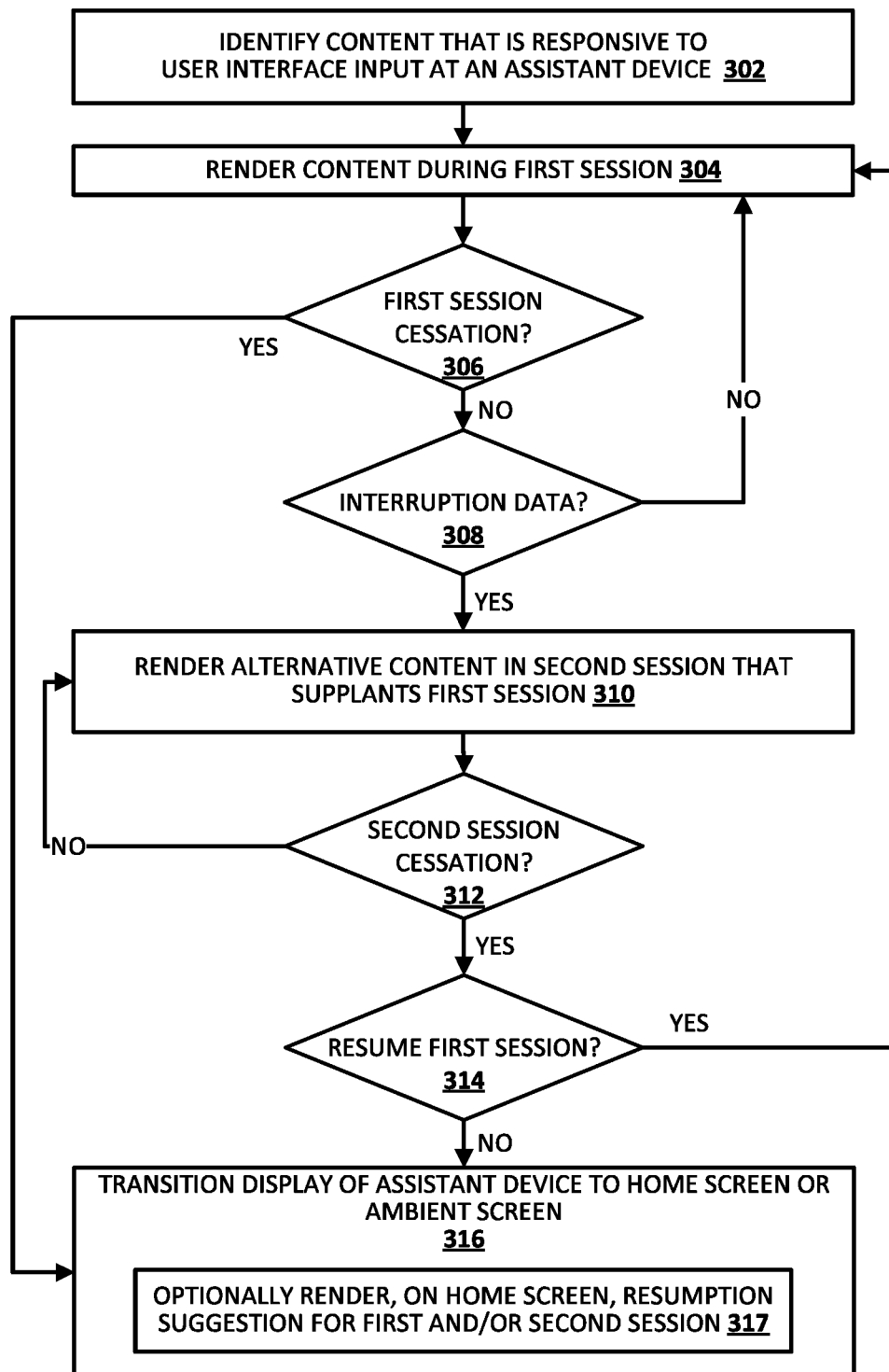
FIG. 3 depicts a flowchart illustrating an example method according to implementations disclosed herein.

FIG. 3 is a flowchart illustrating an example method 300 according to implementations disclosed herein. For convenience, the operations of the flowchart are described with reference to a system that performs the operations. This system may include various components of various computer systems, such as one or more components of computing systems that implement automated assistant 120. Moreover, while operations of method 300 are shown in a particular order, this is not meant to be limiting. One or more operations may be reordered, omitted or added.

At block 302, the system identifies content that is responsive to user interface input at an assistant device. For example, the user interface input can be a spoken utterance, and the system can identify content that is responsive to the spoken utterance. For instance, in response to "play video X", a video corresponding to "video X" can be identified. As another example, the user interface input can be a touch interaction with a graphical element rendered on a touch-sensitive display of the assistant device, and the responsive content can be responsive to the graphical element. For example, the graphical element can be a recommendation for "video X", and "video X" identified in response to interaction with the graphical element.

At block 304, the system renders content during a first session 304. The system can render the content via user interface output devices of the assistant device, such as a display and/or speaker(s) of the assistant device. In various implementations, the system renders the content exclusively. That is, the system renders the content without rendering any content that is unrelated to the first session (absent content related to an incoming notification, which can be rendered briefly (optionally while pausing content of the first session) to enable the user to affirmatively accept the notification). Rendering of the content during the first session 304 can occur over one or more dialog turns and/or over a long duration of time.

During rendering of the content during the first session, the system monitors, at block 306, for cessation of the first session. If there is a cessation of the first session at block 306, the system can proceed to block 316 and transition the display of the assistant device to a home screen or ambient screen, as described herein. Where the display is a home screen and the cessation of the first session detected at block 306 is not a completion and is not a cancellation, block 316 can include an iteration of optional block 317, where a resumption suggestion for the first session is rendered on the home screen. For example, where the cessation is detected at block 306 in response to a user speaking "pause" and a timeout occurring, a selectable graphical element can be rendered on the home screen that, if selected causes resumption of the first session and continued performance of blocks 304, 306, and 308.

If there is not a cessation of the first session at block 306, the system can proceed to block 308 and determine whether interruption data has been received. Although depicted serially in FIG. 3, it is noted that in various implementations block 306 and block 308 can be performed in parallel and/or "on demand" in response to corresponding input being received. Further, blocks 304, 306, and 308 can all be performed in parallel. For example, block 304 can be continuously be performed while blocks 306 and 308 run in the background. If, at block 308, interruption data is not received, the system proceeds back to block 304 and rendering of the content during the first session 304 continues (e.g., without any interruption).

If, at an iteration of block 308, interruption data is received, the system proceeds to block 310 and renders alternative content in a second session that supplants the first session. The alternative content can be responsive to the interruption data. For example, the alternative content can be responsive to a spoken utterance associated with the interruption data, or can be responsive to a notification associated with the interruption data. In various implementations, the system renders the alternative content exclusively at block 310. That is, the system renders the alternative content without rendering any content that is unrelated to the second session (absent content related to an incoming notification, which can be rendered briefly (optionally while pausing content of the first session) to enable the user to affirmatively accept the notification). Rendering of the alternative content during the second session 310 can occur over one or more dialog turns and/or over a long duration of time.

In some implementations of block 310, the rendering of alternative content in the second session can supplant the first session in response to determining that at least one required output modality for the alternative content (e.g., audible and/or visual) conflicts with at least one output modality being used to render the first content in the first session. In some of those implementations, if the modalities don't conflict (e.g., one of the alternative and first content is audible only and the other of the alternative and first content is visual only), block 314 can be skipped as the first session is not halted since both the first session and the second session can co-occur through different output modalities.

During rendering of the alternative content during the second session, the system monitors, at block 312, for cessation of the second session. When a cessation of the second session is detected at an iteration of block 312, the system proceeds to block 314 and determines whether to resume the first session.

If the system determines at block 314 to resume the first session, the system proceeds back to block 304, and automatically resumes the rendering of the content during the first session, optionally from a state of the first session that corresponds to its state with the interruption data was detected at block 308.

If the system determines at block 314 to not resume the first session, the system proceeds to block 316, and transitions the display of the assistant device to a home screen or ambient screen, as described herein. Where the display is a home screen, block 316 can include an iteration of optional block 317, where a resumption suggestion for the first session and/or a resumption suggestion for the second session is rendered on the home screen. For example, where the first session includes enduring content, a selectable graphical element can be rendered on the home screen that, if selected causes resumption of the first session and continued performance of blocks 304, 306, and 308. Also, for example, where the second session includes enduring content, and the second session cessation of block 312 was not a completion or a cancellation, a selectable graphical element can be rendered on the home screen that, if selected, causes resumption of the second session.

In various implementations, determining whether to resume the first session at block 314 can be based at least in part on one or more properties of the first session and/or one or more properties of the second session, such as whether the content of the first session is enduring or transient content and/or whether the alternative content of the second session is enduring or transient content. Although depicted serially in FIG. 3, it is noted that in various implementations blocks 310, 312, and 314 can be performed in parallel. For example, block 310 can be continuously be performed while blocks 312 continuously runs in the background, and the determination of block 314 can be preemptively determined in one iteration prior to block 312 occurring.

Figure 4:
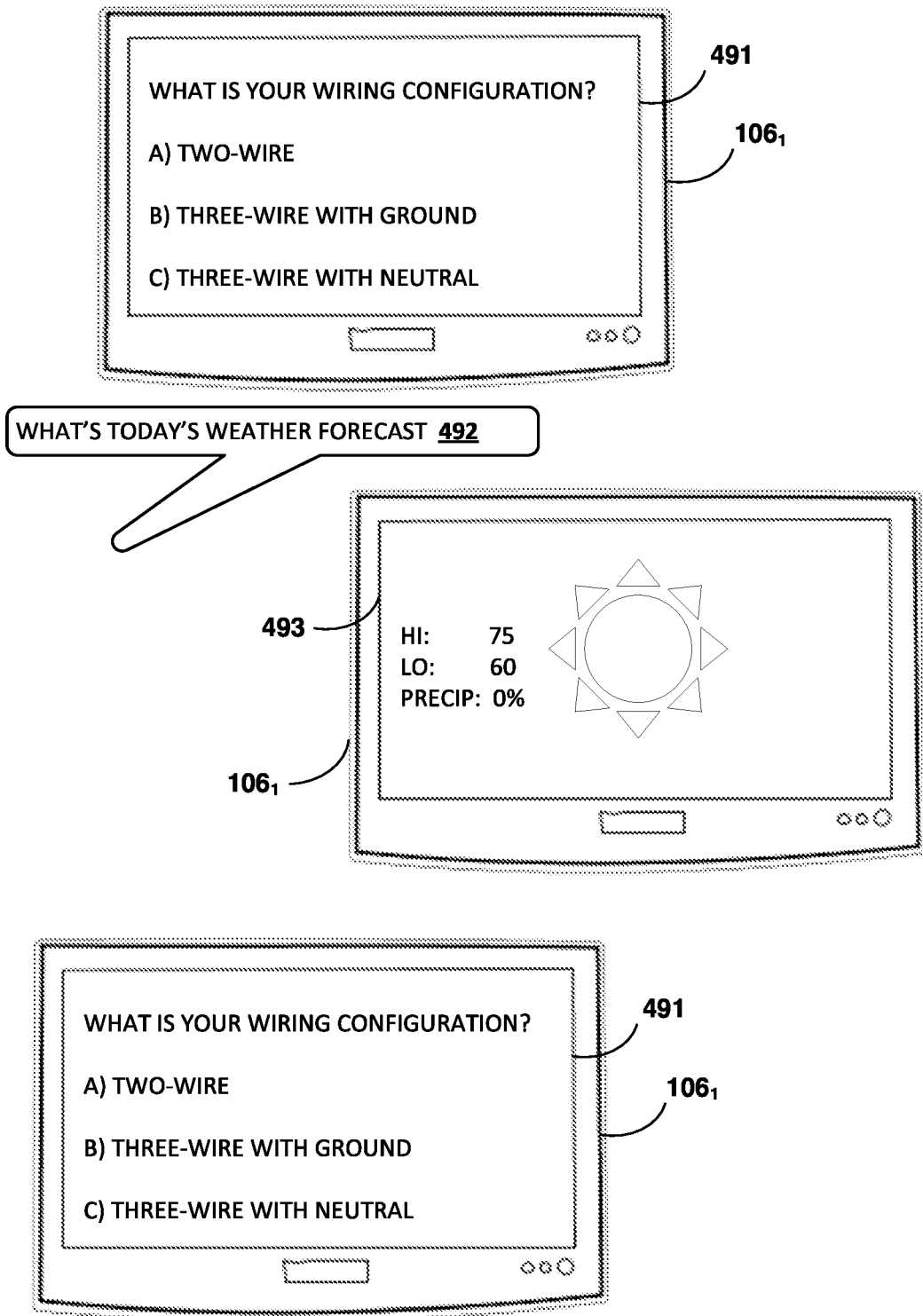
FIG. 4 illustrates an example of rendering first content during a first session, rendering alternative content during a second session in response to receiving interruption data during the rendering of the first content during the first session, and automatically resuming the first session upon cessation of the second session.

FIG. 4 illustrates an example of rendering first content 491 during a first session, rendering alternative content 493 during a second session in response to receiving interruption data during the rendering of the first content during the first session, and automatically resuming the first session upon cessation of the second session.

In FIG. 4, and as represented by the topmost first client device 106₁, the first content 491 can be rendered on a display of the first client device 106₁ in response to a user request to have the automated assistant 120 facilitate wiring of a smart thermostat. The first content 491 represents just a portion of the first content that is rendered during the first session to such a user request, and is rendered during one of multiple dialog turns of the first session. It is noted that, although not depicted, corresponding audible content of the first session can also be rendered by speakers of the first client device 106₁. Prior to cessation of the first session, and while the first content 491 is being rendered, the user provides a spoken utterance 492 of "what's today's weather forecast". Such a spoken utterance 492 constitutes interruption data as it is a request for alternative content that is unrelated to the first session.

In response to the spoken utterance, and as represented by the middle first client device 106₁, the automated assistant causes the rendering of the first content 491 to be supplanted by alternative content 493 in a second session. The alternative content 493 is responsive to the spoken utterance 492, supplants the first content 491, and is rendered exclusively by the display. It is noted that in various implementations audible alternative content of the second session can also be rendered by speakers of the first client device 106₁.

Upon cessation of the second session, and as represented by the bottommost first client device 106₁, the first session is automatically resumed. The cessation of the second session can occur, for example, in response to a timeout or in response to a user indicating completion through user interface input (e.g., speaking "Done", swiping "back", etc.). In some implementations, the first session can be automatically resumed based at least in part on the first content 491 of the first session being classified as enduring content, and the second content 493 of the second session being classified as transient content.

Figure 5:
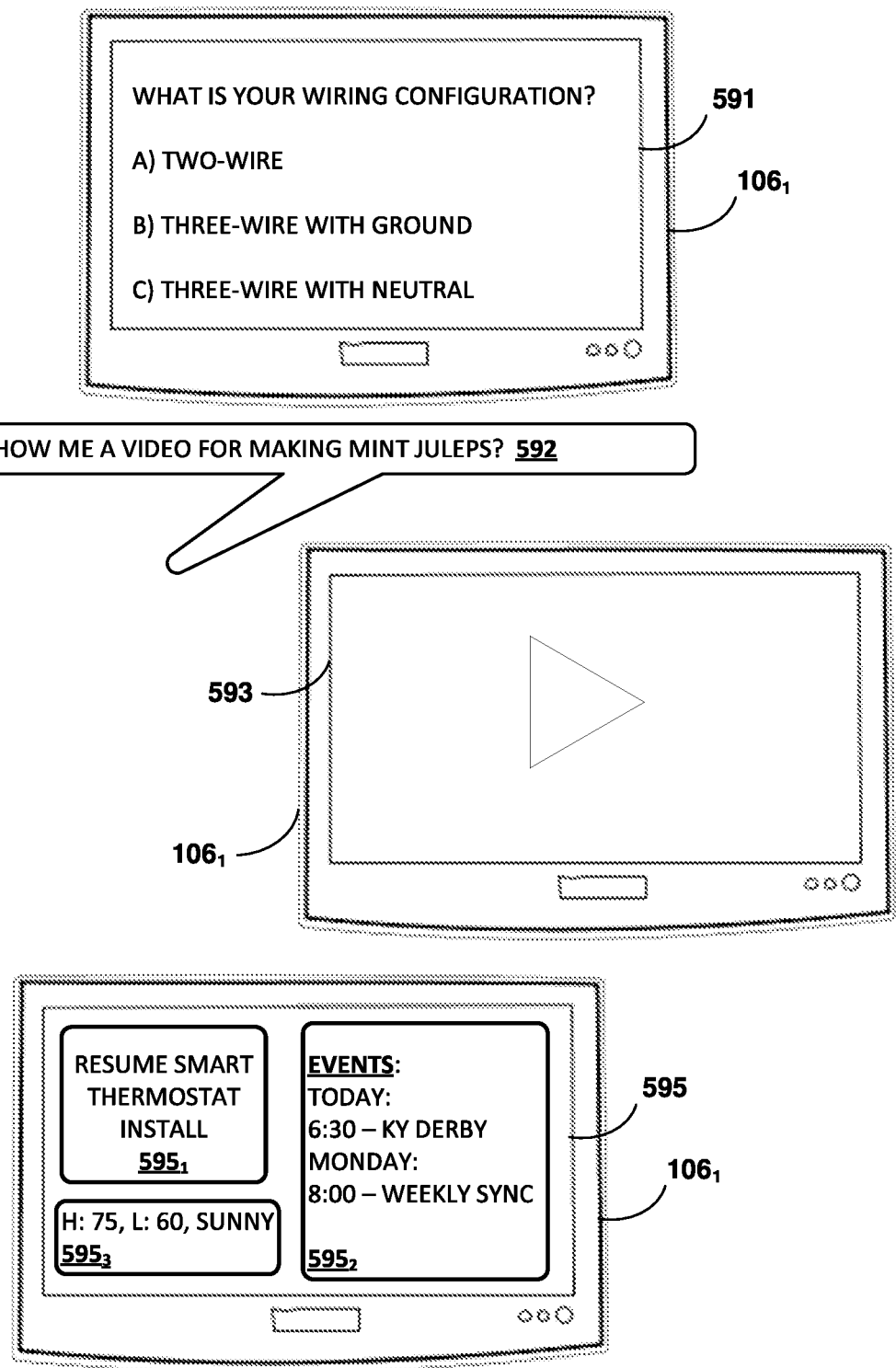
FIG. 5 illustrates an example of rendering first content during a first session, rendering alternative content during a second session in response to receiving interruption data during the rendering of the first content during the first session, and, upon cessation of the second session, transitioning to an alternative state in which the first session is suggested for resumption, but not automatically resumed.

FIG. 5 illustrates an example of rendering first content 591 during a first session, rendering alternative content 592 during a second session in response to receiving interruption data during the rendering of the first content during the first session, and, upon cessation of the second session, transitioning to an alternative state 595 in which the first session is suggested for resumption, but not automatically resumed.

In FIG. 5, and as represented by the topmost first client device 106₁, the first content 591 can be rendered on a display of the first client device 106₁ in response to a user request to have the automated assistant 120 facilitate wiring of a smart thermostat. The first content 591 can be similar to the first content 491 of FIG. 4. Prior to cessation of the first session, and while the first content 591 is being rendered, the user provides a spoken utterance 592 of "show me a video for making a mint julep". Such a spoken utterance 592 constitutes interruption data as it is a request for alternative content that is unrelated to the first session.

In response to the spoken utterance, and as represented by the middle first client device 106₁, the automated assistant causes the rendering of the first content 591 to be supplanted by alternative content 593 in a second session. The alternative content 593 is responsive to the spoken utterance 592, supplants the first content 591, and is rendered exclusively by the display. In the Example of FIG. 5, the alternative content 593 is an enduring video related to making a mint julep, and that is automatically played in response to the spoken utterance 592 that constitutes interruption data.

Upon cessation of the second session, and as represented by the bottommost first client device 106₁, the first session is not automatically resumed. Instead, the display of the client device 106₁ is transitioned to an alternative "home" state 595 in which the first session is suggested for resumption via graphical element 595₁, but not automatically resumed. Graphical element 595₁, if selected through touch input, can cause the first session to be resumed. In some implementations, the first session can be not automatically resumed based at least in part on the alternative content 593 of the second session being classified as enduring content. In some implementations, the graphical element 595₁ can be provided based at least in part on the first session content 591 of the first session being classified as enduring content. It is noted that in the home state 595, other graphical elements 595₂ and 595₃ are also provided that display upcoming events that are tailored to the user, and a local weather forecast, respectively.

Figure 6:
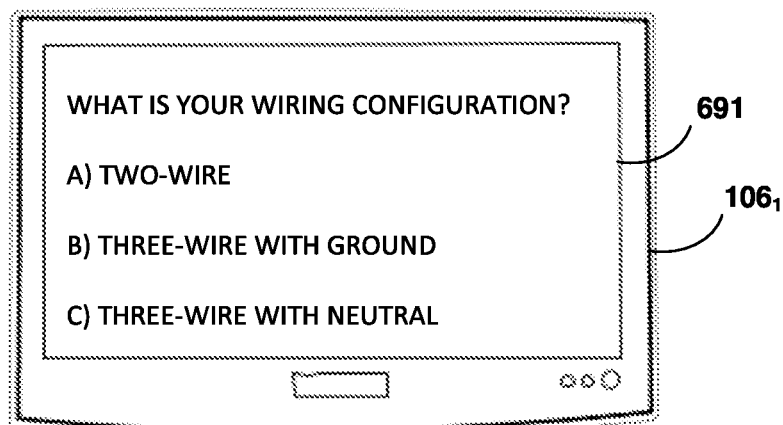
FIG. 6 illustrates another example of rendering first content during a first session, rendering alternative content during a second session in response to receiving interruption data during the rendering of the first content during the first session, and automatically resuming the first session upon cessation of the second session.
Figure 6:
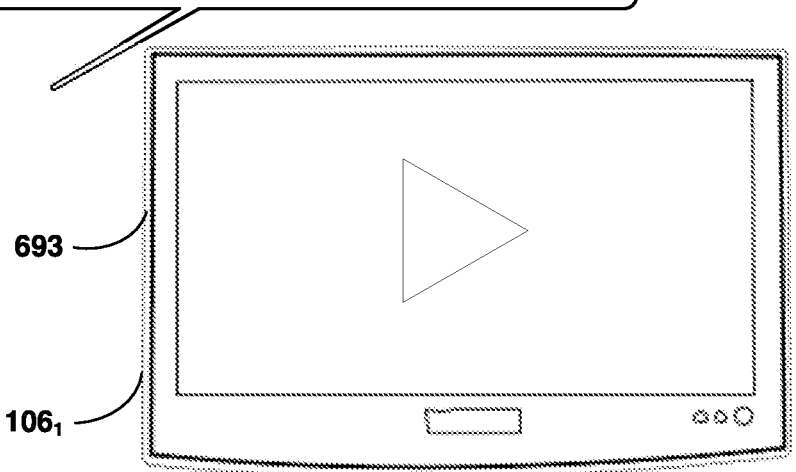
Figure 6:
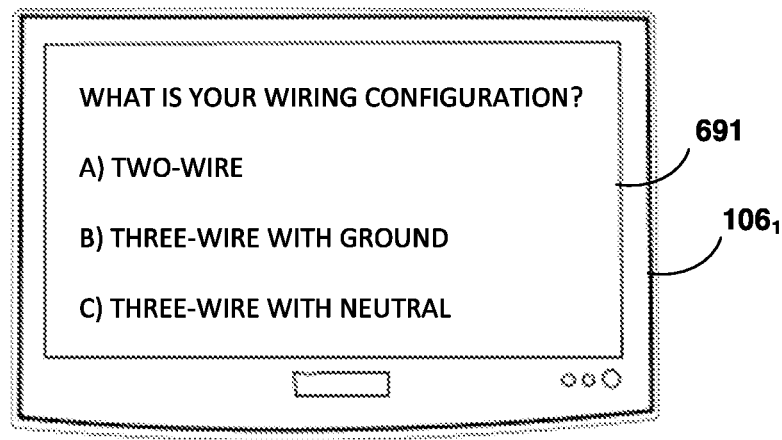

FIG. 6 illustrates another example of rendering first content 691 during a first session, rendering alternative content 692 during a second session in response to receiving interruption data during the rendering of the first content during the first session, and automatically resuming the first session upon cessation of the second session.

In FIG. 6, and as represented by the topmost first client device 106₁, the first content 691 can be rendered on a display of the first client device 106₁ in response to a user request to have the automated assistant 120 facilitate wiring of a smart thermostat. The first content 691 can be similar to the first content 491 of FIG. 4. Prior to cessation of the first session, and while the first content 691 is being rendered, the user provides a spoken utterance 692 of "show me a video for distinguishing ground and neutral". Such a spoken utterance 692 constitutes interruption data as it is a request for alternative content that is unrelated to the first session. For example, it does not cause continuance of presentation of first content from the first session but, rather, constitutes a request for alternative content that is not included in the first content.

In response to the spoken utterance, and as represented by the middle first client device 106₁, the automated assistant causes the rendering of the first content 691 to be supplanted by alternative content 693 in a second session. The alternative content 693 is responsive to the spoken utterance 692, supplants the first content 691, and is rendered exclusively by the display. In the Example of FIG. 6, the alternative content 693 is an enduring video related to distinguishing ground and neutral wires, and that is automatically played in response to the spoken utterance 692 that constitutes interruption data.

Upon cessation of the second session, and as represented by the bottommost first client device 106₁, the first session is automatically resumed. In the example of FIG. 6, the first session is automatically resumed despite the alternative content of the second session being classified as enduring content. In some implementations, when the alternative content of the second session is classified as enduring content, the first session is not automatically resumed unless one or more other conditions are present. Such an additional condition is present in the example of FIG. 6. Namely, the additional condition can be determining that content of the prior first session embodies one or more entities, such as an "electrical wiring" entity and/or more granular "ground wire" and/or "neutral wire" entities and that a defined relationship exists between the entities of the first session, and the alternative content of the second session. For example, the relationship can be that the video of the second session also embodies an "electrical wiring" entity and/or the more granular "ground wire" and/or "neutral wire" entities. Determining that such entities are embodied by the first content of the first session and/or the alternative content of the second session can be based on terms, titles, and/or other properties of the content and alternative content, and can optionally be based on reference to a knowledge graph, such as a knowledge graph described above. For example, an entity tagger of the natural language processor 122 (FIG. 1) can tag such entities based on text associated with the first content and the alternative content.

Figure 7:
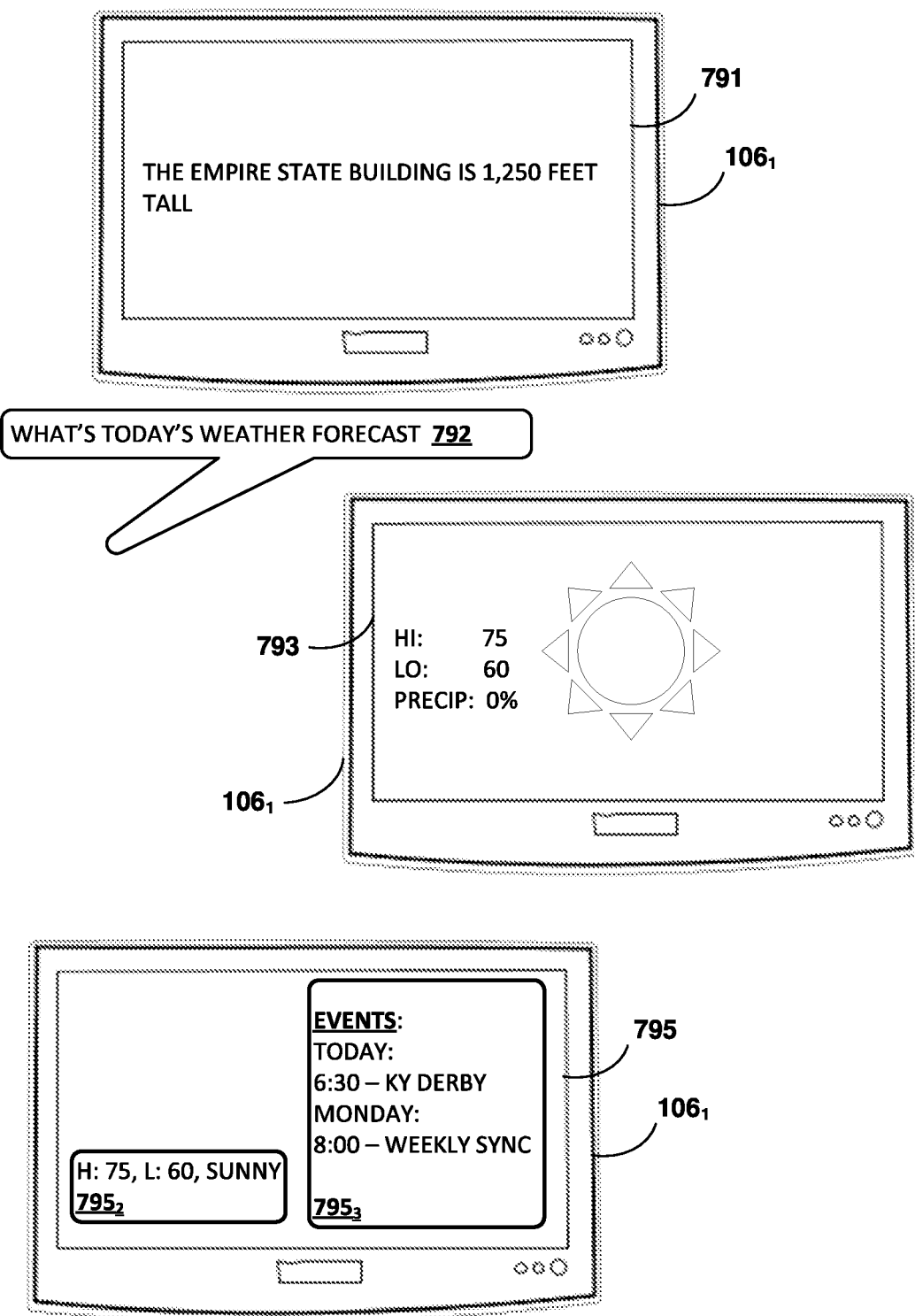
FIG. 7 illustrates an example of rendering first content during a first session, rendering alternative content during a second session in response to receiving interruption data during the rendering of the first content during the first session, and, upon cessation of the second session, transitioning to an alternative state in which the first session is not automatically resumed and is not suggested for resumption.

FIG. 7 illustrates an example of rendering first content 791 during a first session, rendering alternative content 793 during a second session in response to receiving interruption data during the rendering of the first content during the first session, and, upon cessation of the second session, transitioning to an alternative state in which the first session is not automatically resumed and is not suggested for resumption.

In FIG. 7, and as represented by the topmost first client device 106₁, the first content 791 can be rendered on a display of the first client device 106₁ in response to a user spoken utterance of "how tall is the empire state building". The first content 791 is transient content, and represents an entirety of the first content that is rendered during the first session (absent corresponding audio content that can optionally be simultaneously rendered). Prior to cessation of the first session, and while the first content 791 is being rendered, the user provides a spoken utterance 792 of "what's today's weather forecast". Such a spoken utterance 792 constitutes interruption data as it is a request for alternative content that is unrelated to the first session.

In response to the spoken utterance, and as represented by the middle first client device 106₁, the automated assistant causes the rendering of the first content 791 to be supplanted by alternative content 793 in a second session. The alternative content 793 is responsive to the spoken utterance 792, supplants the first content 791, and is rendered exclusively by the display.

Upon cessation of the second session, and as represented by the bottommost first client device 106₁, the first session is not automatically resumed. Instead, the display of the client device 106₁ is transitioned to an alternative "home" state 795 in which the first session is not automatically resumed and is not suggested for resumption via any graphical element. In some implementations, the first session can be not automatically resumed and not suggested for resumption based at least in part on the first session content 791 of the first session being classified as transient content. It is noted that in the home state 795, graphical elements 795₁ and 795₂ are provided that display upcoming events that are tailored to the user, and a local weather forecast, respectively.

Figure 8:
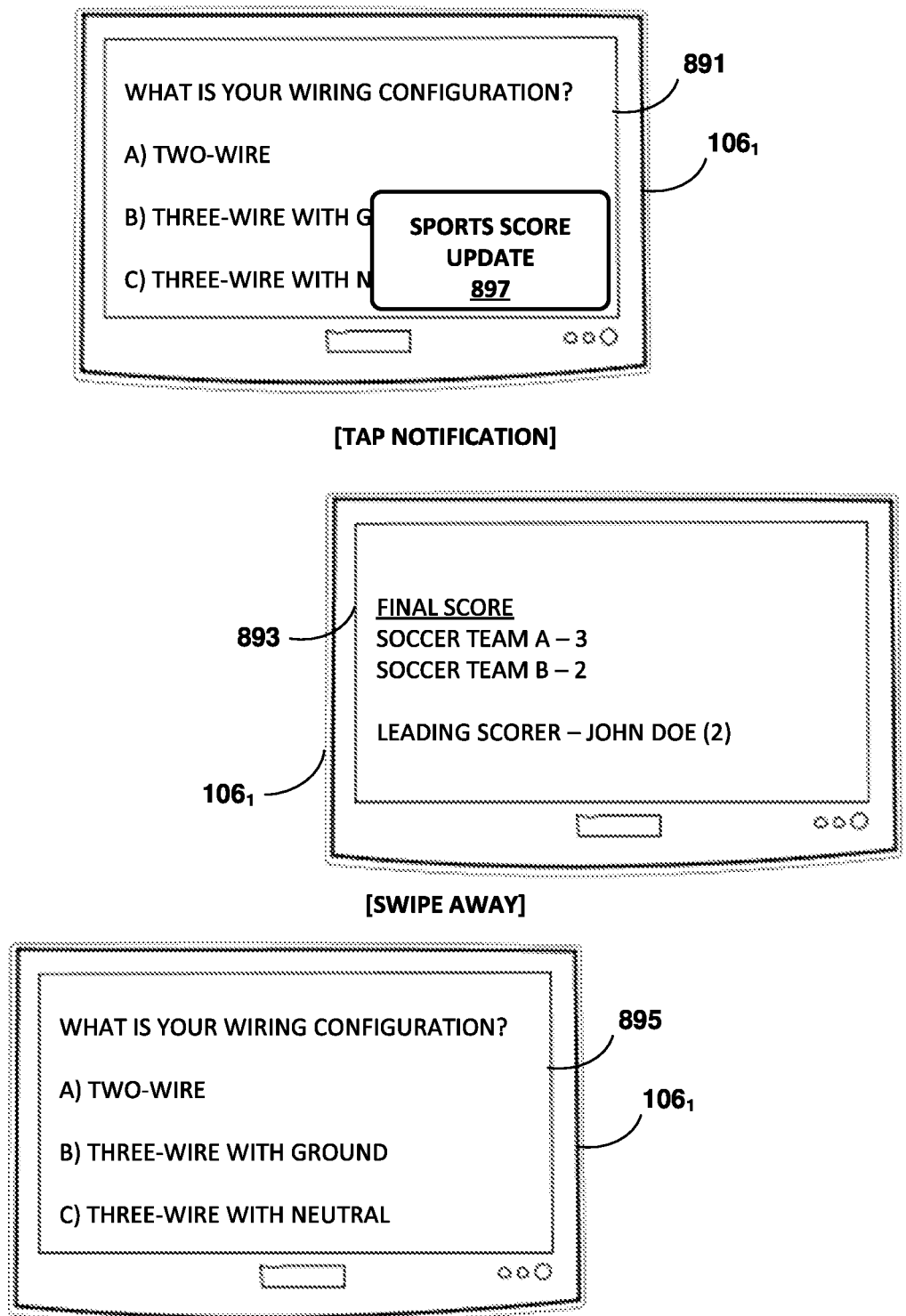
FIG. 8 illustrates another example of rendering first content during a first session, rendering alternative content during a second session in response to receiving interruption data during the rendering of the first content during the first session, and automatically resuming the first session upon cessation of the second session.

FIG. 8 illustrates another example of rendering first content 891 during a first session, rendering alternative content 893 during a second session in response to receiving interruption data during the rendering of the first content during the first session, and automatically resuming the first session upon cessation of the second session.

In FIG. 8, and as represented by the topmost first client device 106₁, the first content 891 can be rendered on a display of the first client device 106₁ in response to a user request to have the automated assistant 120 facilitate wiring of a smart thermostat. Prior to cessation of the first session, and while the first content 891 is being rendered, a notification 897 is temporarily rendered atop the first content 891 during the first session. The notification 897 informs the user of a sports score update that is available. As indicated in FIG. 8, the user "taps" the notification 897, which constitutes interruption data.

In response to the interruption data, and as represented by the middle first client device 106₁, the automated assistant causes the rendering of the first content 891 to be supplanted by alternative content 893 in a second session. The alternative content 893 is responsive to the notification 897 and includes additional visual and optional content related to the sports score update of the notification. The alternative content 893 supplants the first content 891, and is rendered exclusively by the display.

Upon cessation of the second session, and as represented by the bottommost first client device 106₁, the first session is automatically resumed. The cessation of the second session can occur, for example, in response to a timeout, in response to a user indicating completion through user interface input (e.g., speaking "Done", swiping "back"), etc. In some implementations, the first session can be automatically resumed based at least in part on the first content 891 of the first session being classified as enduring content, and the second content 893 of the second session being classified as transient content.

Figure 9:
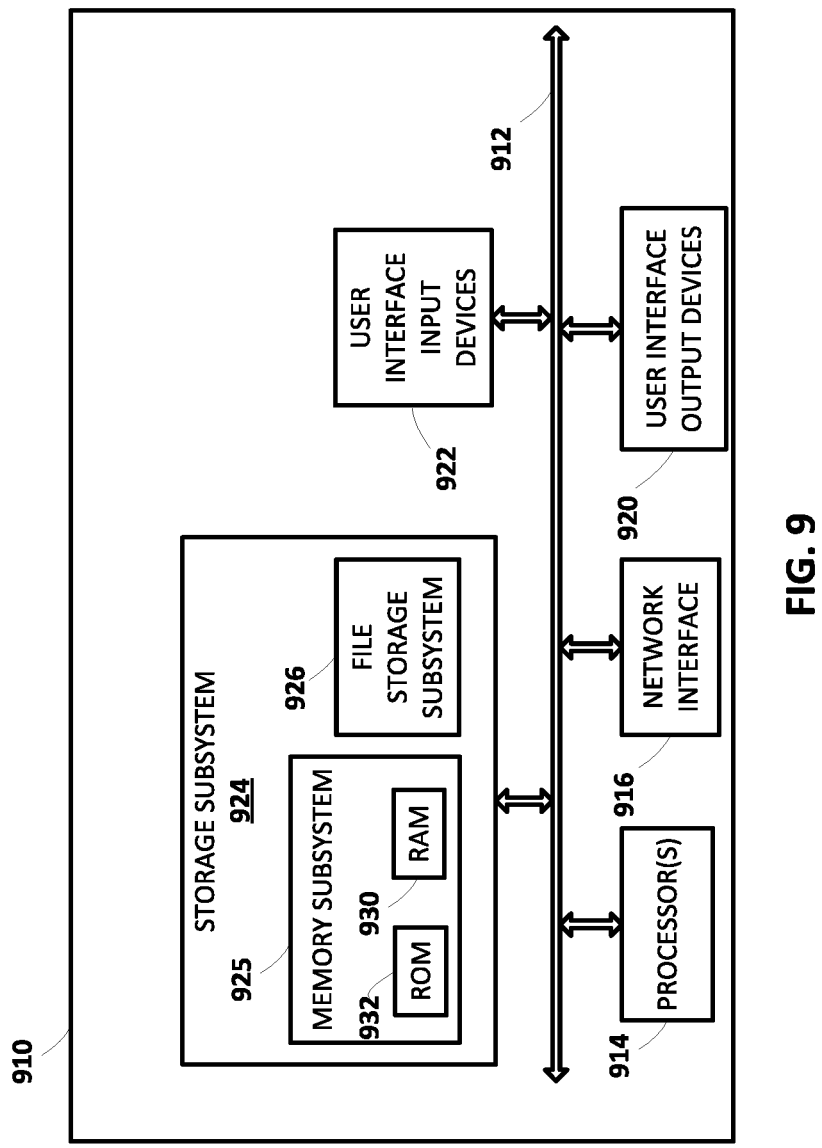
FIG. 9 is a block diagram of an example computing device.

FIG. 9 is a block diagram of an example computing device 910 that may optionally be utilized to perform one or more aspects of techniques described herein. In some implementations, one or more of a client computing device, user-controlled resources engine 130, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIG. 3, as well as to implement various components depicted in the figures and/or described herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

What is claimed is:

1. A method implemented using one or more processors, the method comprising:
   receiving, over multiple dialog turns of a first dialog session that is between a user and an automated assistant, spoken utterance data indicative of multiple spoken utterances of a user detected via one or more microphones of a client device;
   identifying, based on the spoken utterance data, multiple instances of first content that are each responsive to a corresponding one of the multiple spoken utterances of the user;
   causing the client device to render the first content during the first dialog session;
   receiving interruption data during rendering of at least part of the first content by the client device during the first dialog session, the interruption data received in response to further user interface input of the user that is detected during rendering of the at least part of the first content during the first dialog session;
   in response to receiving the interruption data:
      storing session data, for the first dialog session, in local memory of the client device or in remote memory of a remote server in network communication with the client device,
         wherein the session data indicates a state of the first dialog session when the interruption data was received;
      causing the client device to render alternative content during a second dialog session that at least temporarily replaces the first dialog session, wherein the alternative content is different from the first content, and wherein causing the client device to render the alternative content during the second dialog session comprises causing the client device to render the alternative content in lieu of the first content;
   determining whether to cause the client device to automatically resume the first dialog session;
   in response to determining to cause the client device to automatically resume the first dialog session:
      retrieving the stored session data for the first dialog session, and
      automatically resuming the first dialog session in the state indicated by the session data; and
   in response to determining to not cause the client device to resume the first dialog session:
      causing the client device to transition to an alternative state in which the client device does not automatically resume the first session.

2. The method of claim 1, wherein determining whether to cause the client device to resume the first dialog session is based on one or more properties of the first dialog session.

3. The method of claim 2, wherein the one or more properties of the first dialog session comprise a classification assigned to the first content.

4. The method of claim 3, wherein the classification assigned to the first content indicates whether the first content is transient or enduring.

5. The method of claim 1, wherein determining whether to cause the client device to resume the first dialog session is based on one or more properties of the first dialog session and is further based on one or more properties of the second dialog session.

6. The method of claim 1, wherein storing the session data, for the first dialog session, comprises storing the session data in the local memory without storing the session data in the remote memory.

7. The method of claim 1, wherein the alternative state in which the client device does not automatically resume the first dialog session comprises display of a home screen or an ambient screen.

8. The method of claim 7, wherein the display of the home screen or the ambient screen lacks any reference to the first dialog session.

9. The method of claim 7, wherein the display of the home screen or the ambient screen includes a selectable graphical interface element that can be selected to resume the first dialog session.

10. A system comprising:
    one or more processors;
    memory operably coupled with the one or more processors, wherein the memory stores instructions that, in response to execution of the instructions by one or more processors, cause the one or more processors to:
       receive, over multiple dialog turns of a first dialog session that is between a user and an automated assistant, spoken utterance data indicative of multiple spoken utterances of a user detected via one or more microphones of a client device;
       identify, based on the spoken utterance data, multiple instances of first content that are each responsive to a corresponding one of the multiple spoken utterances of the user;
       cause the client device to render the first content during the first dialog session;
       receive interruption data during rendering of at least part of the first content by the client device during the first dialog session, the interruption data received in response to further user interface input of the user that is detected during rendering of the at least part of the first content during the first dialog session;
       in response to receiving the interruption data:
          store session data, for the first dialog session, in local memory of the client device or in remote memory of a remote server in network communication with the client device,
             wherein the session data indicates a state of the first dialog session when the interruption data was received;
          cause the client device to render alternative content during a second dialog session that at least temporarily replaces the first dialog session, wherein the alternative content is different from the first content, and wherein in causing the client device to render the alternative content during the second dialog session one or more of the processors are to cause the client device to render the alternative content in lieu of the first content;

determine whether to cause the client device to automatically resume the first dialog session;

in response to determining to cause the client device to automatically resume the first dialog session:
retrieve the stored session data for the first dialog session, and
automatically resume the first dialog session in the state indicated by the session data; and in response to determining to not cause the client device to resume the first dialog session:
cause the client device to transition to an alternative state in which the client device does not automatically resume the first session.

11. The system of claim 10, wherein in determining whether to cause the client device to resume the first dialog session one or more of the processors are to determine whether to cause the client device to resume the first dialog session based on one or more properties of the first dialog session.

12. The system of claim 11, wherein the one or more properties of the first dialog session comprise a classification assigned to the first content.

13. The system of claim 12, wherein the classification assigned to the first content indicates whether the first content is transient or enduring.

14. The system of claim 10, wherein in determining whether to cause the client device to resume the first dialog session one or more of the processors are to determine whether to cause the client device to resume the first dialog session based on one or more properties of the first dialog session and further based on one or more properties of the second dialog session.

15. The system of claim 10, wherein in storing the session data, for the first dialog session, one or more of the processors are to store the session data in the local memory without storing the session data in the remote memory.

16. The system of claim 10, wherein the alternative state in which the client device does not automatically resume the first dialog session comprises display of a home screen or an ambient screen.

17. The system of claim 16, wherein the display of the home screen or the ambient screen lacks any reference to the first dialog session.

18. The system of claim 16, wherein the display of the home screen or the ambient screen includes a selectable graphical interface element that can be selected to resume the first dialog session.

* * * * *